US005087012A

United States Patent [19]

Doublet

[11] Patent Number: 5,087,012

[45] Date of Patent: Feb. 11, 1992

[54] TABLE FLAG HOLDER

[75] Inventor: Luc Doublet, Seclin, France

[73] Assignee: Ets. Doublet S.A., Avelin, France

[21] Appl. No.: 543,365

[22] Filed: Jun. 26, 1990

[30] Foreign Application Priority Data

Sep. 12, 1989 [FR] France ............................ 89 12212

[51] Int. Cl.[5] ............................ F16M 13/00

[52] U.S. Cl. ............................ 248/512; 211/60.1; 248/519

[58] Field of Search ............... 248/512, 513, 519, 520; 211/69, 60.1

[56] References Cited

U.S. PATENT DOCUMENTS

D. 48,166 11/1915 Bennett ............................ 211/69 X
1,103,257 7/1914 Bollinger, Jr. ...................... 248/512
1,308,340 7/1919 Deibel et al. .................. 248/512 X
1,314,549 9/1919 Tobel ............................ 248/519 X
1,845,881 2/1932 Kuehner ........................ 248/512 X
2,177,513 10/1939 Beard .
3,431,041 3/1969 Fontlladosa .................. 211/60.1 X
3,456,806 7/1969 Borston ............................ 211/60.1
3,574,498 4/1971 Zarinsky ........................ 248/512 X
3,727,771 4/1973 Hoffman ............................ 211/69
4,826,338 5/1989 Kilpatrick .

FOREIGN PATENT DOCUMENTS 1078829 11/1954 France .
234195 5/1925 United Kingdom ................ 211/69
376052 7/1932 United Kingdom ............... 248/513

*Primary Examiner*—David L. Talbott
*Attorney, Agent, or Firm*—Sandler, Greenblum & Bernstein

[57] ABSTRACT

Table flag holder intended to decorate a desk or a table for supporting a pole and banner is provided with a base, and a plurality of inclined surfaces on the base. The plurality of inclined surfaces are constructed and arranged in concentric crowns so that viewing of adjacent flags is not obstructed. Each of the plurality of inclined surfaces includes a series of holes capable of supporting a pole within each hole. Moreover, there is provided a mechanism for radially orienting each of the poles with respect to the base so as to avoid rotation of the pole with respect to the base.

7 Claims, 3 Drawing Sheets

TABLE FLAG HOLDER

BACKGROUND OF THE INVENTION

1. Field of the Invention

The invention relates to a table flag holder, having applications particularly for manufacturers of office accessories or decorative objects.

The use of table flag holders has been known for a number of years, but the way in which they are used is developing. At international gatherings the different representatives of each nation are frequently distinguished by the presence of a table flag holder placed in front of the representative of the country in question, the flag of course representing the national emblem of that country.

Table flag holders are also found amongst industrialists of anglo-saxon or far eastern countries who like to decorate their desks with the flag of the country to whose economic success they contribute.

This phenomenon is also developing in Europe where it is common to use not only one single flag but all of the emblems of the European Economic Community.

Until now the manufacture of the table flag holders has always been carried out on a small scale by craftsmen or on a semi-industrial basis. The table flag holder comprises a base surmounted by a pole at the end of which is attached the piece of cloth. The base and the pole are made from pieces of wood. The pole is turned, the base also, then it is necessary to pierce holes in the latter in order to place the pole or poles therein.

This piercing operation constitutes precisely the delicate part of the work which it is very difficult to automate. In fact, when several poles have to be put in place on one and the same base, it is desirable if not imperative to incline the different poles with respect to one another in order to distance the cloth banners. The piercing of inclined holes necessitates repeated operations on the base. A simple translation of the part is not sufficient, it is necessary to add a rotational movement in order to give the inclination during piercing of the hole.

The machining is complex and, because it requires numerous repeated operations, the cost of the part is high. It must also be emphasised that the different banners present on a base can be oriented in any manner whatsoever, which means that it is necessary during positioning of the poles to take particular precautions in order to orient the banners correctly.

Currently the manufacturing technique utilized for the production of the flag holders can be envisaged when it is a question of placing one flag per base, although the machining by individual turning, even carried out in series, is relatively long and therefore costly. However, when several poles have to be put in place on one single base, the current manufacturing techniques are quite unsuitable.

SUMMARY OF THE INVENTION

The principal object of the present invention is to present a table flag holder which is specially designed to be manufactured in an economic and convenient manner for use even when several poles can be put in place on the base.

The manufacturing technique proposed is injection moulding. This technique is perfectly adapted to large series and makes it possible to obtain precise parts with a low unit cost.

Specially designed for placing several poles on one base, the flag holder of the present invention makes it possible to obtain a systematic orientation of all of the banners placed in it. In particular, irrespective of the number of flags placed in it, all of the banners are oriented radially, that is to say they are ordered and very visible.

In contrast to the previous techniques for construction from wood, in which only manual orientation of each of the flags would make it possible to arrive at this advantageous positioning, the base of the present invention permits automatic positioning of the flags.

The table flag holder according to the invention can be dismantled easily in order to be put away and it is designed in such a way that the banner can be changed in order to be re-used on different occasions.

Other aims and advantages of the present invention will become clear during the course of the following description which is, however, given only by way of example and is not intended to limit the invention.

According to the invention, the table flag holder which is intended to decorate a table, a desk or the like and is composed of a base on which are arranged one or several poles supporting a banner, is characterized in that it has means for orienting the banner.

BRIEF DESCRIPTION OF THE DRAWINGS

The invention will be better understood by reading the following description accompanied by the attached drawings in which.

DETAILED DESCRIPTION OF THE PREFERRED EMBODIMENTS

The present invention relates to a table flag holder which is particularly intended to decorate a desk, a table or the like. It principally concerns the manufacturers of office accessories.

Whether from patriotic pride or in order to make it possible to distinguish the nationality of one or several individuals at meetings, a table flag holder is frequently used in order to display a national emblem.

A flag holder is traditionally composed of a wooden base, a pole fitted into the base and a banner. Manufacture of these items is very costly. In addition, the positioning of the flags in rotation is not easy.

The precise object of the present invention is to reduce very substantially the cost of manufacturing the flag holders and to make them more convenient to use even when one base is to receive several emblems, as occurs more and more frequently.

Figure 1:
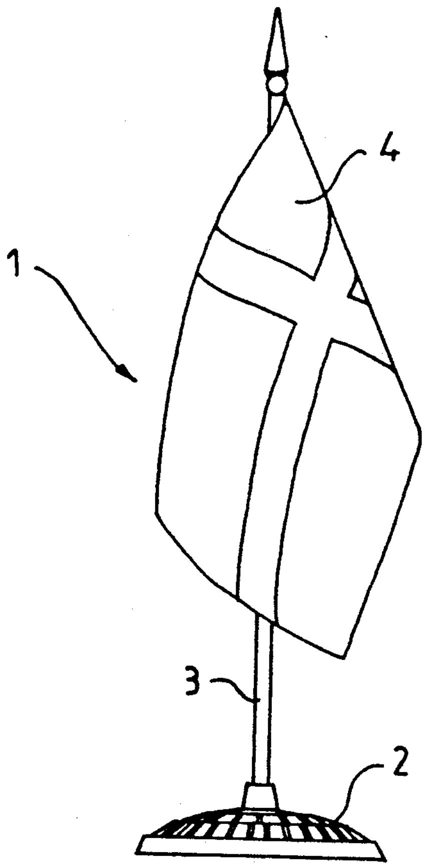
FIG. 1 shows a table flag holder equipped with one single banner.

FIG. 1 shows the table flag holder 1 of the present invention in its simplest version, that is to say when one single banner is put in place. The flag holder comprises a base 2 into which a pole 3 supporting a banner 4 is fitted. The banner 4 can be made in one piece from cloth, paper, card or some other material. Generally the banner is printed with the colours of a national emblem, a set of initials, a trade mark or the like.

Figure 2:
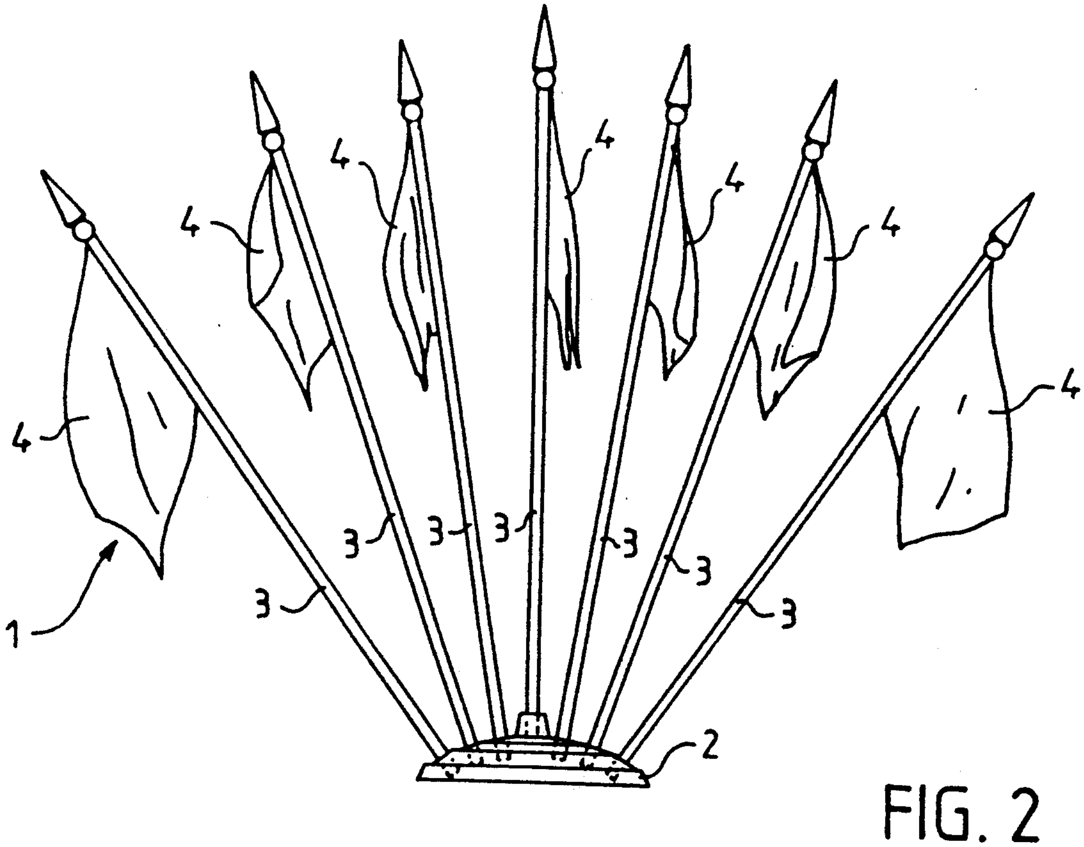
FIG. 2 shows different flags placed on one and the same base.

In certain applications, for example in the case of a Federation, Community, etc. . . . , it is desirable to be able to regroup different flags on the same base. This is precisely one of the objectives of the present invention and FIG. 2 shows the placing of several poles 3, bearing banners 4, on one and the same base 2.

The flag holder 1 of the present invention has two characteristics which favor the use with several poles and flags. First of all, the flag holder has means for orienting each banner on the base 2. Thus, each of the banners 4 is oriented radially with respect to the base 2. It is a matter of a preferred orientation so that each banner 4 is visible.

Then, the inclination of the different poles 3 has been designed so that as a function of their position the banners of the adjacent poles do not constitute an obstruction and more particularly do not mask their own banner 4.

Figure 3:
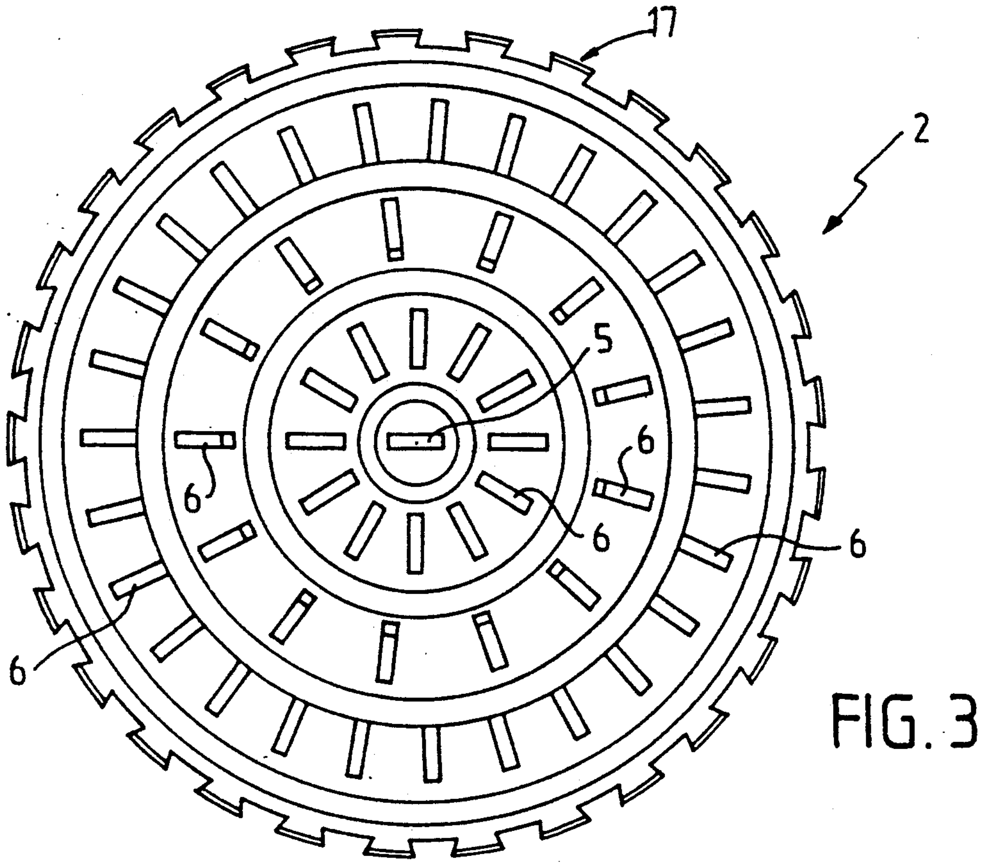
FIG. 3 shows the base in plan view.

FIG. 3 shows a plan view of the base 2 of the flag holder of the present invention. This base is preferably made from injected plastic material. This is a particularly economical process when it is a question of large-scale production. Polypropylene is well adapted to this process of manufacture by moulding.

The base 2 has a central hole 5 intended to be used for placing the principal pole. This hole 5 is slightly raised with respect to the rest of the base 2 so that the banner of the central flag is dominant. Then the base 2 has a series of holes 6 arranged in a concentric circle. These holes 6 are capable of receiving poles.

In the chosen example, the base 2 is capable of receiving three crowns of flags, the internal crown having twelve holes 6, the intermediate crown 13 and the external crown 27. This makes it possible to adapt to the different configurations which might be encountered.

In addition, the periphery of the base 2 has means, notably in the form of dovetail toothing 17, for connecting several bases. Other fixing arrangements could be used, but this one offers the advantage of being simple and permits an arrangement of several bases by fitting them into one another by means of the dovetailing. Great freedom is given in this respect since it is possible to fix several bases 2 with different angular settings.

Figure 4:
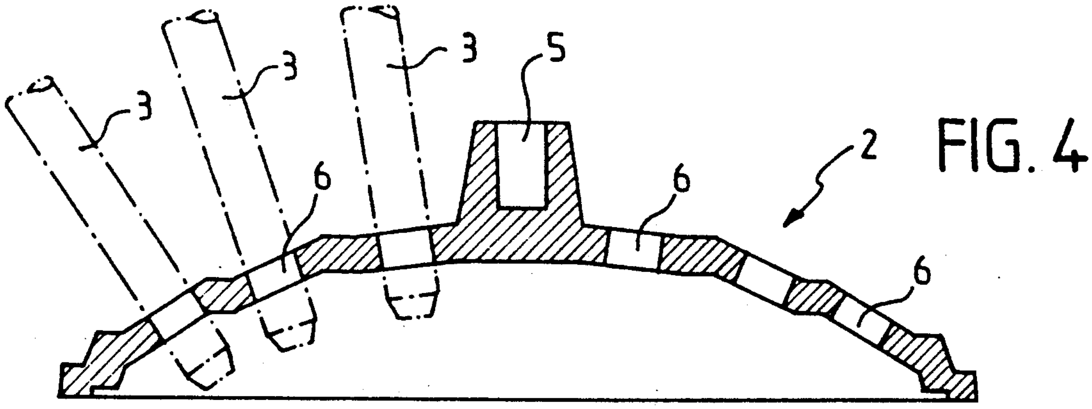
FIG. 4 shows schematically in section the base according to FIG. 3.
Figure 5:
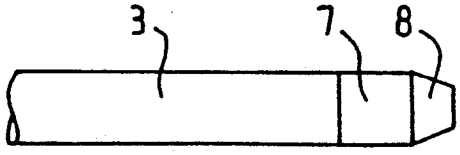
FIG. 5 shows in a detail view the end of the pole to be fitted in the base.

This being the case, the means used for orienting the banners are illustrated in FIG. 4 which shows the base 2 in sectional view. The holes 6 of the different crowns are cut in the form of a mortise, that is to say they have a rectangular profile. In addition, the end of the poles 3 is shaped as a tenon 7, as shown in FIG. 5.

In addition, in order to facilitate the introduction of the pole 3 into the holes 5 or 6 of the base 2, the end of the pole 3 has a chamfer 8. The tenon shape 7 of the end of the pole 3 permits its introduction into the holes 6 and the change of profile of the pole forms a shoulder and a longitudinal stop to prevent the pole from penetrating too deeply into the hole 6.

The different crowns in which the holes 6 are made have inclinations adapted so as to prevent the banners of the poles 3 coming into contact with the poles of the lower crowns. For example, for the internal crown with a diameter of approximately 22 mm the inclination is 9°, for the central crown with a diameter of approximately 47 mm the inclination is 19° and for the external crown with a diameter of approximately 68 mm the inclination is 35°.

In order to ensure that the tenon-shaped ends 7 of the poles 3 have a good seating, the holes 6 have internal flanks the inclination of which corresponds to that of the poles 3.

The profile of the base 2 takes the form of superposed truncated cones, each having the inclination corresponding to the crown of poles 3 to be put in place. Thus the base of the pole 3 rests not only on the flank of the tenon 7, which rests on the wall of the hole 6, but also at the level of the base of the pole 3 which rests on the inclined surface of the truncated cones of each of the crowns.

The progressive inclination of the different crowns has the effect of distancing the upper ends of the poles whilst taking account of the fact that the inclination of each pole also has a tendency to cause the banner to jut out.

Figure 6:
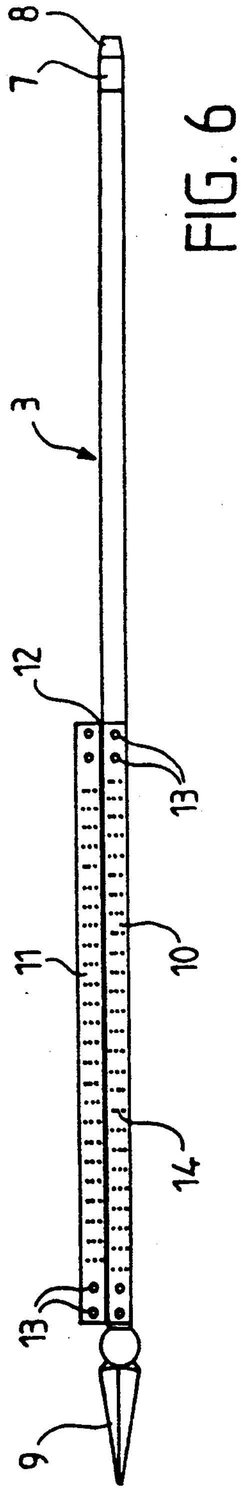
FIG. 6 shows the pole and its device for fixing the banner.

Although it is possible to envisage different devices for fixing the banner on the pole 3, FIG. 6 shows schematically one of the possible embodiments of the pole 3. The pole has in its upper part an ornamental point 9 which corresponds to that present on larger-scale flag poles.

In addition, in its upper part the pole 3 has two parts 10 and 11 which are articulated by a central hinge 12. When the parts 10 and 11 are turned down on one another, they correspond to the profile of the pole 3. Complementary locking devices 13 are present at each of the ends of the parts 10 and 11 to lock the closure of these parts when they are are turned down against one another. For example, it is possible to envisage a device for locking by studs fitting into complementary cavities.

The surface of the parts 10 and 11 of the pole is decorated for example with barbs 14 or scores in order to retain the piece of cloth between the parts 10 and 11 when they are turned down on one another.

The advantage of the structure of the pole of the present invention is that it can be produced entirely by injection. The hinge is obtained by means of of localised thinning of the piece and no subsequent machining operation is necessary. It is sufficient to grip the flag between the parts 10 and 11.

Figure 7:
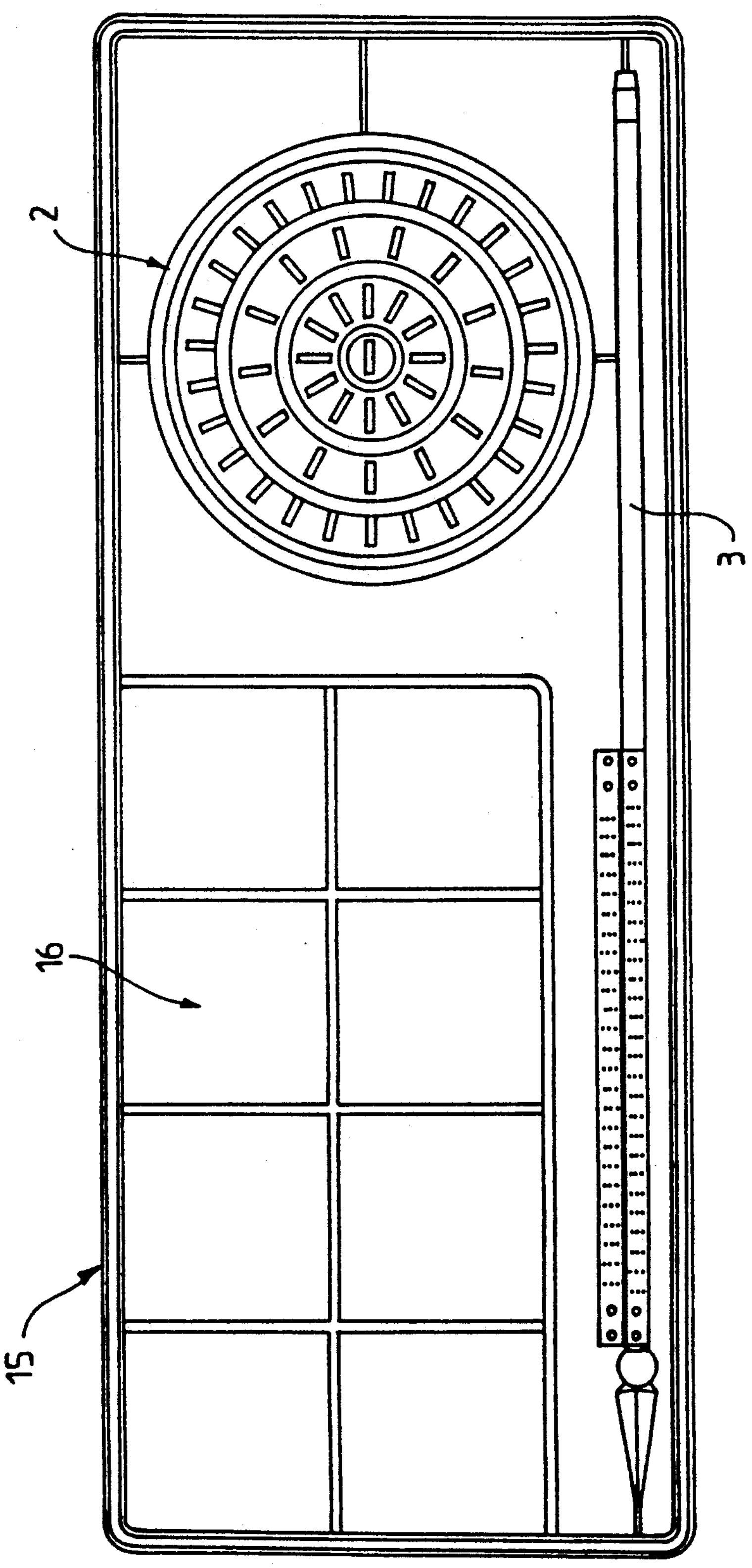
FIG. 7 shows the flag holder of the present invention put in place in a commercial packaging case.

For selling the flag holder, it is advantageous to use a case 15 such as illustrated in FIG. 7, in which are grouped the base, the pole 3 and a basket 16 in which one or several banners are arranged.

Other embodiments of the present invention within the understanding of the expert in the art could be envisaged without in any way departing from the scope of the invention.

I claim:

1. A table flag holder for flags which include a pole and a banner supported by the pole, said table flag holder comprising:

a base;

a plurality of inclined planar surfaces on said base, said plurality of inclined surfaces being constructed and arranged in concentric crowns, with inclination of the surfaces of the concentric crowns increasing outwardly so that viewing of a banner and adjacent banners is not obstructed, and each of said plurality of inclined planar surfaces having a series of holes capable of supporting a pole within each hole, said concentric crowns having diameters of 22 mm, 47 mm and 68 mm, and inclinations thereof being 9°, 19° and 35°, respectively; and means for radially orienting each of the poles with respect to said base so as to avoid rotation of the pole with respect to the base.

2. The table flag holder according to claim 1, wherein said means for radially orienting each of the poles comprises holes in said series of holes being in the form of a mortise hollowed in the base, and adapted to receive a pole in the form of a tenon.

3. The table flag holder according to claim 2, wherein holes are hollowed within said base, and the internal walls of the holes hollowed in the base have an orientation that is parallel to the direction of each pole.

4. The table flag holder according to claim 1, wherein the periphery of the base includes means for connecting several bases.

5. The table flag holder according to claim 1, in combination with a plurality of poles and a plurality of banners.

6. The table flag holder according to claim 5, wherein each pole of said plurality of poles includes, fixedly attached at an upper part thereof, two portions connected by a central hinge that permits a banner to be gripped and immobilized.

7. In combination, a table flag holder, a plurality of poles and a plurality of banners, said table flag holder comprising:

a base;

a plurality of inclined planar surfaces on said base, said plurality of inclined surfaces being constructed and arranged in concentric crowns, with inclination of the surfaces of the concentric crowns increasing outwardly so that viewing of a banner and adjacent banners is not obstructed, and each of said plurality of inclined planar surfaces having a series of holes capable of supporting a pole within each hole, said concentric crowns having diameters of 22 mm, 47 mm and 68 mm, and inclinations thereof being 9°, 19° and 35°, respectively; and each pole of said plurality of poles including, fixedly attached at an upper part thereof, two portions connected by a central hinge that permits a banner to be gripped and immobilized.

* * * * *